Figure 1:
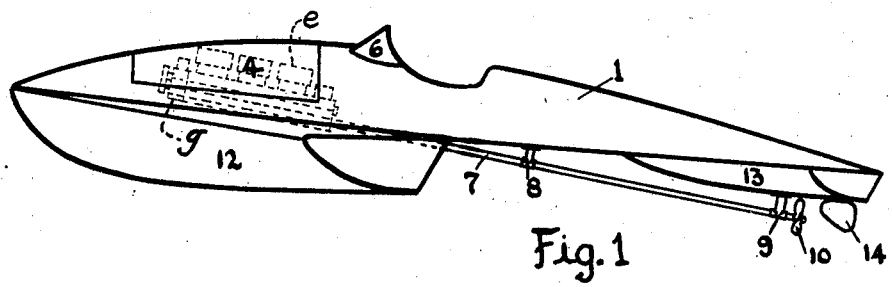

March 21, 1944.  T. A. E. LAKE  2,344,619

DISPLACEMENT-HYDROPLANE BOAT

Filed Feb. 15, 1940  6 Sheets-Sheet 1

INVENTOR
Thomas A. Edison Lake

March 21, 1944. T. A. E. LAKE 2,344,619
DISPLACEMENT-HYDROPLANE BOAT
Filed Feb. 15, 1940 6 Sheets-Sheet 2

INVENTOR
Thomas A. Edison Lake

March 21, 1944. T. A. E. LAKE 2,344,619
DISPLACEMENT-HYDROPLANE BOAT
Filed Feb. 15, 1940 6 Sheets-Sheet 3

INVENTOR
Thomas A. Edison Lake

March 21, 1944.   T. A. E. LAKE   2,344,619
DISPLACEMENT-HYDROPLANE BOAT
Filed Feb. 15, 1940   6 Sheets-Sheet 4

INVENTOR
Thomas A. Edison Lake

March 21, 1944. T. A. E. LAKE 2,344,619
DISPLACEMENT-HYDROPLANE BOAT
Filed Feb. 15, 1940 6 Sheets-Sheet 5

INVENTOR
Thomas A. Edison Lake

March 21, 1944.   T. A. E. LAKE   2,344,619
DISPLACEMENT-HYDROPLANE BOAT
Filed Feb. 15, 1940   6 Sheets-Sheet 6

INVENTOR
Thomas A. Edison Lake

Patented Mar. 21, 1944

2,344,619

UNITED STATES PATENT OFFICE 2,344,619

DISPLACEMENT-HYDROPLANE BOAT

Thomas A. Edison Lake, Stratford, Conn., assignor to George B. Cluett, 2nd, Troy, N. Y.

Application February 15, 1940, Serial No. 319,062

9 Claims. (Cl. 114—66.5)

The object of this invention is to provide a type of water vehicle, or boat, combining the rough-water navigating ability of the displacement type of boat and the high-speed performance of the hydroplane type of boat, plus greater safety, greater riding comfort and greater maneuverability than is found in ordinary boats of either the displacement or hydroplane type.

A further object of this invention is to provide a type of water vehicle, or boat, particularly suitable and efficient for use as military, commercial or pleasure craft, and easily adapted for mass production manufacture.

In a general way this invention relates to improvements on the type of water vehicle described in my United States Patent No. 1,846,602. The improvements claimed are based upon actual tests and demonstrated performance. The need and desirability of these improvements is recognized by anyone familiar with high-speed boating and understanding practical naval architecture.

Ordinary displacement hulls navigate in rough water much better than ordinary hydroplane hulls. However, ordinary hydroplane hulls are much faster than ordinary displacement hulls on smooth water. Since this invention combines the rough-water navigating qualities of the displacement form of hull with the high-speed ability of the hydroplane form of hull, a brief explanation and comparison of these two forms of hulls is important because a combination of certain of the features of each type of hull results in a form, or design, which, in rough water, functions like a displacement hull at moderate speed, but which, at increased and high speed, on smooth or moderate water, functions like a hydroplane hull.

"Rough water" and "smooth water" are relative descriptive terms. That which would be considered as rough water for a small outboard motor boat would be relatively smooth water for a torpedo boat, and that which might be considered as rough water for a torpedo boat would be relatively smooth water for a giant ocean liner or battleship.

Displacement type hulls have relatively round bottoms or modifications of such lines, and are sometimes a combination of flat and V-bottom lines. They have sharp bows designed to part the water sideways. They have been the best type of boat for rough-water navigation. However, displacement type hulls do not compare with hydroplane hulls for high speed on smooth or moderate water.

Hydroplane type hulls have relatively flat bottoms and are designed to climb up on top of the water and glide or plane upon the surface water instead of plowing through as ordinary displacement hulls do. Although much faster than displacement hulls, ordinary hydroplane hulls are not suitable for rough-water navigation.

The ordinary displacement hull is a good rough-water hull because it has a sharp bow which acts like an inverted plow to part waves and rough water sideways so that the hull can follow through in the trough made in the surface water. Generally there is a balancing of wave thrust and surface pressure on each side of the bow and pounding is thus minimized.

The ordinary hydroplane hull is not a good rough-water hull because of its relatively flat sled-like bottom. Driving such a boat fast or even at moderate speed on rough water causes the hull to jump and pound. Since the ordinary hydroplane hull does not plow through the water but instead climbs up upon the surface all the thrust and pressure of the water is upwards with no counter-balancing thrust or pressure from the opposite direction. Ordinary hydroplane boats are rough riding and lack genuine stability and safety at high speed.

In making the above comparisons I have referred to the "ordinary" or fundamental types of displacement and hydroplane hulls. Fundamentally, each is superior in its own field but neither functions efficiently in both fields. In recent years each type dominated its own field because the requirements for each type were individual. Boats for general use, cruising and rough-water navigation were always of the displacement or semi-displacement hull type. Boats for smooth-water racing or use as fast runabouts on moderate water were always of the hydroplane or semi-hydroplane hull type. However, there is now a definite need and genuine demand for a type of boat that is capable of both rough-water navigation and high-speed performance. This dual capability is desirable for all types of water craft, but it is now particularly important and essential for military craft. Seaworthiness, high speed and maneuverability are absolutely essential for torpedo boats and destroyers, and certainly are desirable in even the smaller military craft such as "water wasps" and so-called "suicide boats."

For a number of years I have been experimenting with water vehicles and seeking a solution to the problem of providing high speed combined with safety and rough-water navigability. The explanations and claims for practicability which I make in this specification are based upon practical knowledge and actual experience, and not only upon theoretical design and argument.

In the tests and development of my Pontoon-hydroplane boat, United States Patent No. 1,846,602, I provided greater stability through three-point separation of the buoyant hydroplanes, greater maneuverability through banking and steering the buoyant hydroplanes, and greater riding comfort through cushioning connections between the chassis, or body, and the buoyant hydroplanes. Rough-water navigability and speed were both enhanced by this cushioning.

In craft of the type referred to in the next preceding paragraph the buoyant hydroplanes could be banked to prevent skidding or capsizing when making sharp turns at high speed. Normally, the longitudinal axes of the buoyant hydroplanes were parallel to the direction of travel of the craft and their bottom planing surfaces were laterally parallel to the surface of the water. When making turns, the two front buoyant-hydroplanes would be banked in the same direction to prevent skidding. Later, the control mechanism was changed so that besides banking the buoyant-hydroplanes, as above described, they could also be banked in opposite directions so that the two front buoyant-hydroplanes, when so banked, represented the two halves of a V-bottom boat separated by an open space. To further develop the tests undertaken, further changes in controls and connections were made so that, in addition to adjusting the buoyant-hydroplanes to form a disconnected V as viewed in vertical cross section, the buoyant-hydroplanes could also be adjusted to form a disconnected V when viewed in plan.

The reference to my earlier patent, tests and later changes in control and operation, as mentioned in the two next preceding paragraphs, records the initial development of present theory and practical demonstration, besides forming the basis for a better understanding of the explanation of the drawings hereinafter appearing.

I propose, in accordance with the present invention, to provide a combination design which may be considered as both a displacement craft and a hydroplane craft, capable of rough-water navigation and also high speed surface planing. Such a boat can function as a displacement boat when driven at slow or moderate speed in rough water, and when driven at increased and maximum speed on smooth or moderate water it can function as a hydroplane boat. My earlier experiments and tests of my pontoon-hydroplane boat, referred to, proved that it is possible to design and build a water vehicle which, by adjustment of its buoyant planing surfaces, can function either as a displacement boat or a hydroplane boat. Although the present invention provides for adjustment of the buoyant planing surfaces, it also provides for a fixed or rigid form of construction which will function either as a displacement boat or a hydroplane boat and be more desirable for larger craft. Whether of adjustable or fixed construction, my invention will function both as a displacement boat and as a hydroplane boat.

I attain these results, first, by separating the buoyant (water displacing) portion of the structure into two or more units. These buoyant units, which are also planing surfaces, provide a twin-hull craft, a three hull craft, or other multiple hull combinations. (Twin-hull and three-point water contact arrangements are shown in the drawings.) The hulls, or buoyant-hydroplanes, may be directly attached to a body or fuselage, or they may be attached to a chassis which supports a body or streamlined enclosure. The hulls, or buoyant-hydroplanes, may also be connected to the body or fuselage by means of shock-absorbing connections. The shape and positioning of the hulls, or buoyant-hydroplanes make possible the objects sought.

The invention consists in the peculiar and novel features of construction, combination and arrangements of parts as will be hereinafter more fully described and claimed.

Figure 2:
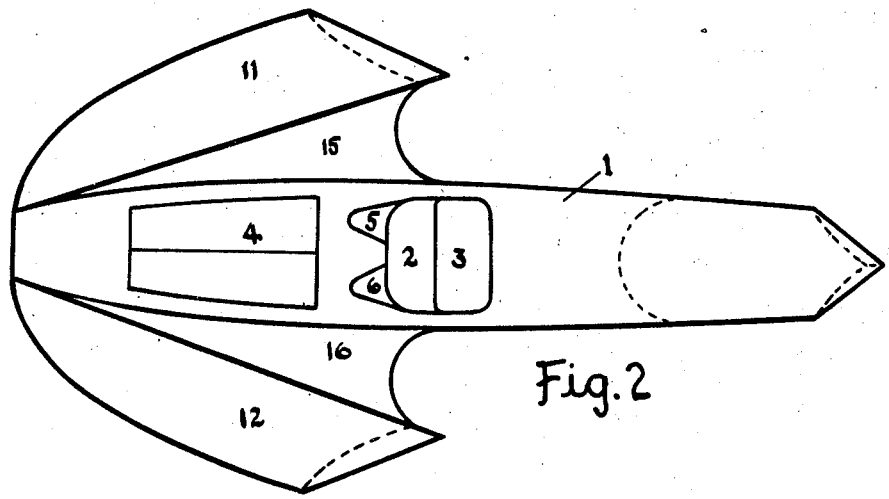
Figure 3:
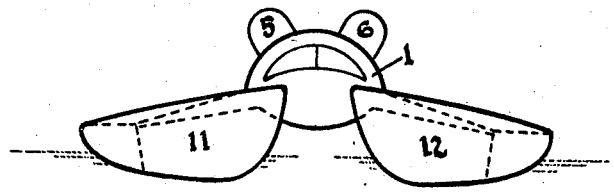
Figure 4:
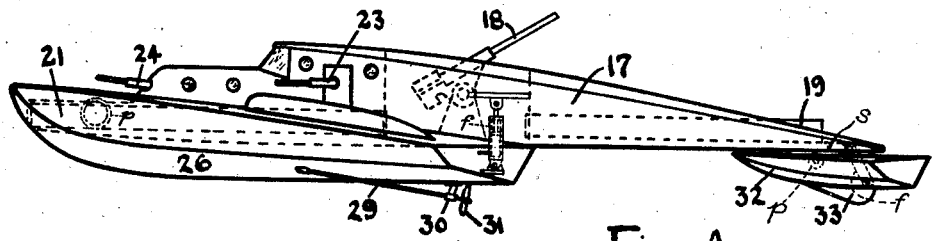
Figure 5:
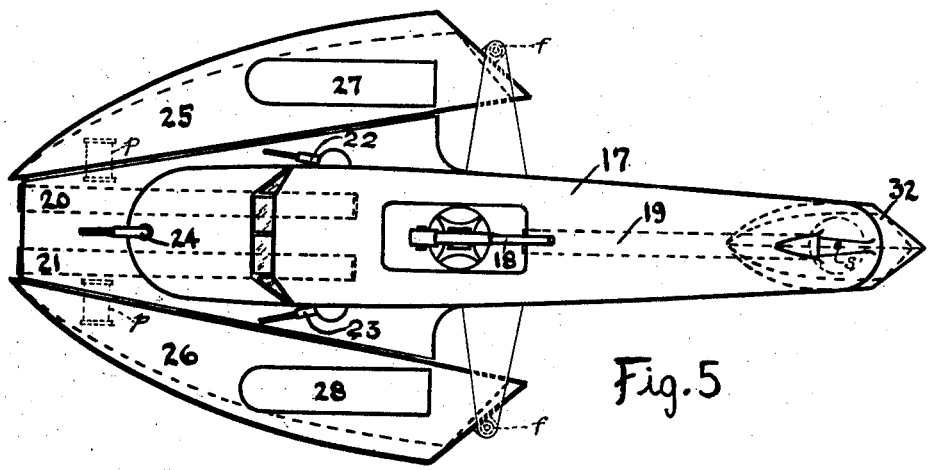
Figure 6:
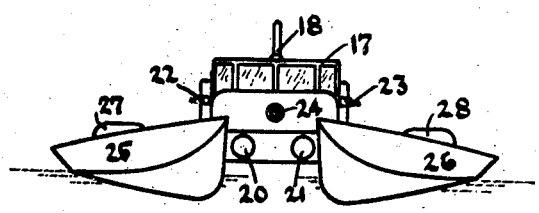
Figure 7:
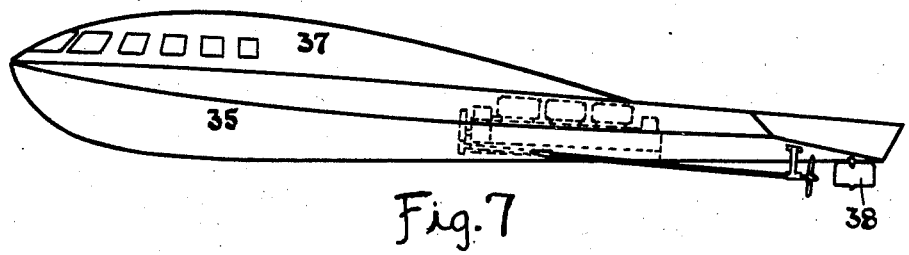
Figure 8:
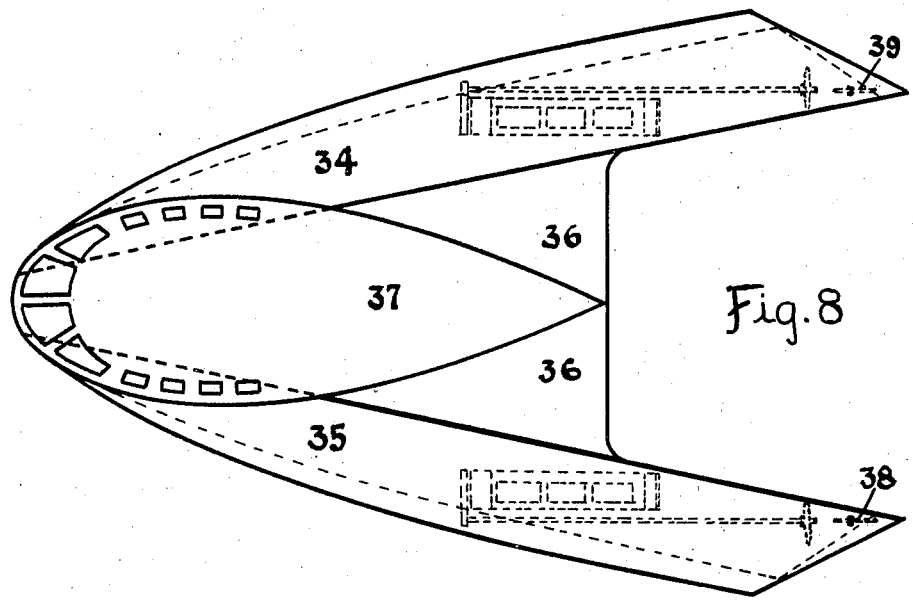
Figure 9:
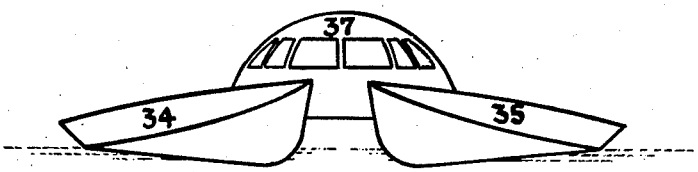
Figure 10:
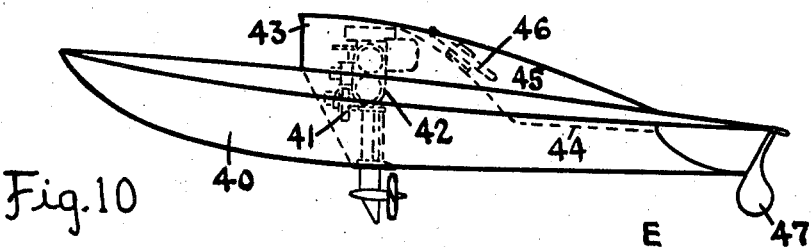
Figure 11:
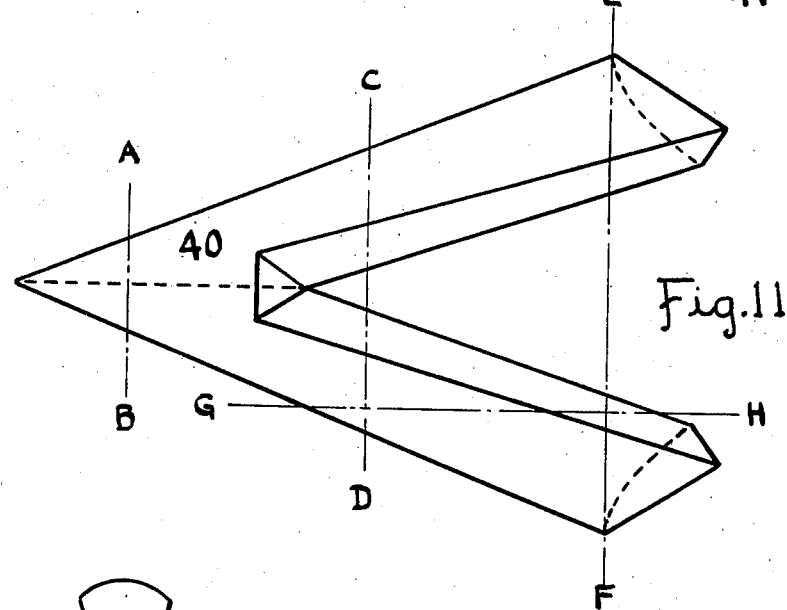
Figure 12:
Figure 14:
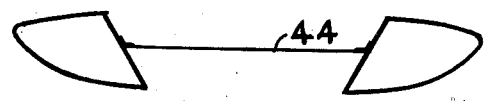
Figure 13:
Figure 15:
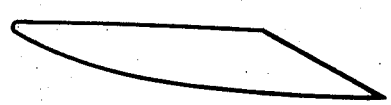
Figure 16:
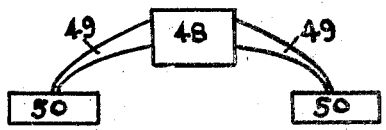
Figure 17:
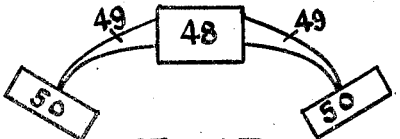
Figure 18:
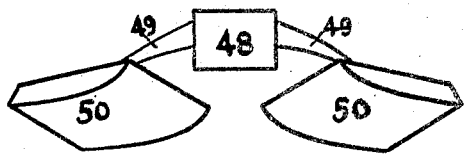
Figure 19:
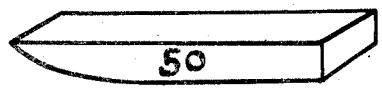
Figure 23:
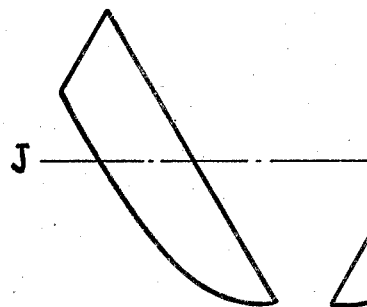
Figure 20:
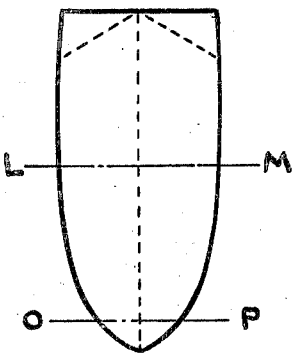
Figure 24:
Figure 21:
Figure 25:
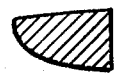
Figure 22:
Figure 26:
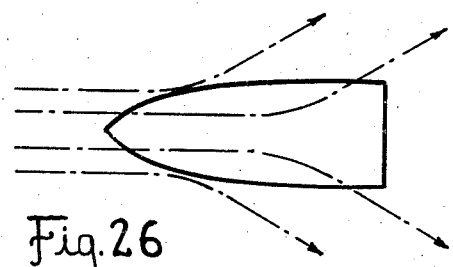
Figure 27:
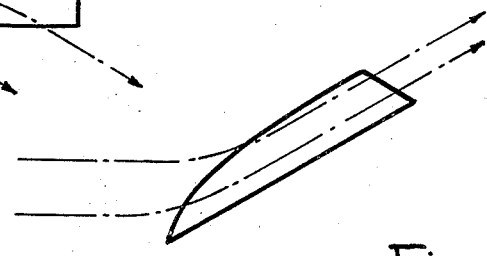
Figure 28:
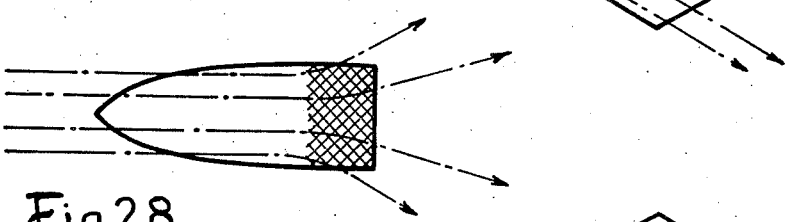
Figure 29:
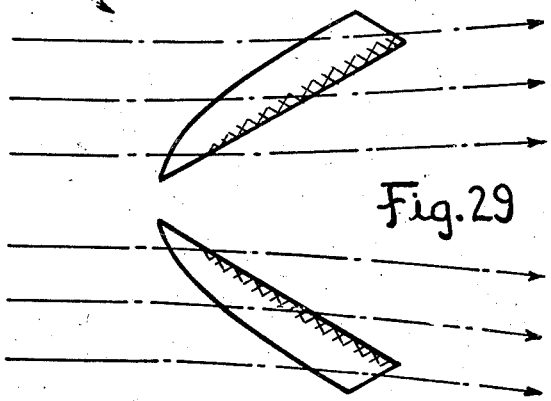

In the drawings, illustrating the invention, in the several drawing figures of which like parts are similarly designated, Fig. 1 is a side elevation of a racing boat design embodying the main features of this invention. Fig. 2 is a plan view of the boat of Fig. 1, and Fig. 3 is a front elevation thereof. Fig. 4 is a side elevation of a high speed military craft embodying the main features of this invention. Fig. 5 is a plan view of the craft of Fig. 4, and Fig. 6 is a front elevation thereof. Fig. 7 is a side elevation of a high speed passenger craft embodying the main features of this invention. Fig. 8 is a plan view of the craft of Fig. 7, and Fig. 9 is a front elevation thereof. Fig. 10 is a side elevation of a small outboard-motor-powered racer embodying the main features of this invention. Fig. 11 is a plan view of the hull only shown in Fig. 10. Fig. 12 is a vertical cross section drawn on the line A—B of Fig. 11. Fig. 13 is a vertical cross section drawn on the line C—D of Fig. 11. Fig. 14 is a cross section drawn on the line E—F of Fig. 11. Fig. 15 is a vertical longitudinal section drawn on the line G—H of Fig. 11. Figs. 16, 17 and 18 are diagrammatic views exemplifying the original tests made in connection with this invention. Fig. 19 is an enlarged perspective view of the buoyant-hydroplane indicated in Figs. 16, 17 and 18. In Figs. 20 to 25 inclusive, which are also diagrammatic views illustrating the development of this invention, Fig. 20 is a plan view of a semi-round bottom displacement hull, Fig. 21 is a vertical cross section drawn on the line O—P of Fig. 20, Fig. 22 is a vertical cross section drawn on the line L—M of Fig. 20, Fig. 23 is a plan view showing an arrangement of the two halves of Fig. 20, with the rear corners cut off as indicated by the dotted lines of Fig. 20, Fig. 24 is a front elevation of Fig. 23, and Fig. 25 is a vertical cross section drawn on the line J—K of Fig. 23. In Figs. 26 to 29, inclusive, which are diagrammatic plan views of a conventional single hull and the divided hull arrangement forming the basis of this invention, Figs. 26 and 28 show flow of water with respect to a conventional hull, and Figs. 27 and 29 show flow with respect to my divided hull arrangement.

In Figs. 1, 2 and 3, 1 is a streamlined body, or fuselage, containing a cockpit 2, a seat 3, and an engine e under the hood or cover 4. There are two windshields 5 and 6. Connecting to the engine by means of the usual clutch and transmission, or gear box g, is the propeller shaft 7, rotatably supported in the strut-bearings 8 and 9 and having a propeller 10 keyed thereon. Since the body 1 is supported above the surface of the water it may be of lighter construction than the water displacing units. Attached to and supporting the body 1 are the two forward buoyant-hydroplane hulls 11 and 12, and the stern of the body 1 is supported by the rear buoyant-hydroplane 13. The buoyant-hydroplane 13 does not pivot to steer but is provided with a conventional rudder 14. Over arms connecting the body 1 with the buoyant-hydroplane hulls 11 and 12 are the fairings, or deck coverings 15 and 16. Other than to designate the buoyant-hydroplanes shown in Figs. 1 to 9 inclusive, their shape and functioning will be left for full explanation hereinafter in connection with the illustrative diagrams. In Figs. 2 and 3 certain parts are omitted in the interest of simplicity as not essential to an understanding of the main features of the invention.

Figs. 1 to 11 inclusive merely indicate possible uses or adaptations of my invention. The drawings are not to scale or related proportions. Other general arrangements and applications or adaptations are possible and therefor intended.

In Figs. 4, 5 and 6, representing a military design, 17 is the armored body or fuselage, fitted with an anti-aircraft gun 18, a stern torpedo tube 19, two bow torpedo tubes 20 and 21, turret machine guns 22 and 23 and a small bow gun 24. Supporting the body 17 are the two forward buoyant-hydroplane hulls 25 and 26. Each of these buoyant-hydroplane hulls constitutes a complete power-propelling unit containing an engine and accessories, substantially as shown in Figs. 7 and 8. 27 and 28 are hatch covers or hoods over the engine compartments. 29 is a propeller shaft, 30 is a strut-bearing and 31 is a propeller. Rotatably attached to and supporting the stern of the craft, as indicated at s, is a steerable buoyant-hydroplane 32, with a skeg or keel 33. In addition to the natural rough-water riding qualities of these buoyant-hydroplane hulls 25, 26 and 32, if greater cushioning is desired, shock-absorbing fittings f and pivot bearings p, respectively, may be used for attaching the buoyant-hydroplane hulls to the body or to a chassis supporting the body as shown in Figs. 4 and 5. Because of its combined rough-water navigability and high-speed maneuverability a military craft of this type should be very efficient.

In Figs. 7, 8 and 9, representing a high-speed passenger craft, there is no third buoyant-hydroplane at the stern. Instead, there are two long buoyant-hydroplane hulls 34 and 35, connected by a platform 36, upon which is mounted a streamlined body 37. The buoyant-hydroplane hulls 34 and 35 are equipped with power plants and accessories, including the rudders 38 and 39. Steering of this craft may be facilitated by control of engine speed and propeller rotation in addition to rudder control. This dihedral hull arrangement is self-banking and skid-resistant when making turns. The twin-hull arrangement shown in Figs. 7, 8 and 9 may also be adapted to military design.

In Figs. 10 to 15 inclusive, representing somewhat diagrammatically an outboard-powered racer, is shown a simple form of the dihedral twin-hull which, in plan view, resembles the bow portion of a larger craft with a V-section cut out as indicated. In Fig. 10 the V-hull 40 has a transom 41 to which is attached an outboard motor 42. There is an air-scoop 43 which also acts as a hood over the motor and, in addition to forcing air into the V-space, extends toward the stern to form a platform 44 and a spray guard 45 for the driver. 46 is a steering wheel to operate rudders at the rear end of each hull section as shown at 47. Fig. 11 is a plan view of the hull Fig. 10 with other parts omitted, and clearly shows the shape and lines of the twin-hull itself. Although in cross section as shown in Figs. 13 and 14, each portion of the V-hull resembles one half of a round bottom displacement hull, in the vertical fore and aft section (Fig. 15) is resembles a sled-like hydroplane. Further reference will be made to these figures in concluding this specification.

As herein before stated, Figs. 16 to 25 inclusive are purely diagrammatic and with Figs. 26 to 29 inclusive are intended to illustrate the basic features of this invention. In Figs. 16, 17 and 18, the body 48, with outrigger arms 49, is supported by hydroplane floats 50 which are adjustable about their lateral and longitudinal axis. Generally, this is the arrangement of floats and connections illustrated in my patent referred to. However, Fig. 16 makes a good diagrammatic foundation for purposes of explanation of the improvements of the present invention, and such a craft was actually used in proving out such improvements. Using Figs. 16, 17 and 18 to illustrate the tests which were made, Fig. 16 indicates the setting of the hydroplane floats 50 for normal forward travel. The floats 50 are sled-like as shown in Fig. 19. Although best for planing at high speed on smooth water, the floats when adjusted as shown in Fig. 16 would pound on rough or choppy water. When the floats 50 were canted as shown in Fig. 17 the craft performed like a V-bottom boat in rough water but would not plane. By maintaining the canted lateral adjustment of the floats shown in Fig. 17 and bringing the bows of the floats toward convergence as shown in Fig. 18, the craft would plane better than when adjusted as shown in Fig. 16 and also navigate rough water as well as when adjusted as shown in Fig. 17. This was the result sought and resulted in development of the dihedral V-hull arrangements shown in Figs. 1 to 11 inclusive. In the tests referred to, at slow or moderate speed the craft would lift slightly and push the water to each side the same as occurs with the ordinary displacement hull. However, as speed was increased, the water ceased being pushed aside and instead cut or sliced back under each float causing the craft to plane. Although the floats 50 when set as shown in Fig. 18 demonstrated the soundness of the basic principle involved, it was apparent that refinement of the hull form was necessary and the divided or half-hull form illustrated in the drawings has been found to be more effective and efficient.

Referring now to Fig. 20 which is a diagrammatic plan view of a fairly wide body displacement form of hull, it will be seen that the dotted lines indicate that hull may be cut in half in following the concept of the invention, and that the corners at the stern are to be cut off. These hull halves, Fig. 23, may be arranged in V formation diverging from bow to stern. In actual practice the half bow section of Fig. 20 would not be the best form when the half-hulls are parted on the angle shown in Fig. 23. However, that would merely require some detail change of form at the bow and has no bearing upon the basic feature involved. The unshaded bow view of Fig. 24 looks almost impossible of being driven ahead at speed, but it must be remembered that the actual form becomes a dihedral wedge which pushes the water aside when travelling at slow speed, but which climbs up and planes upon the surface of the water at higher speeds. Note how the two sections in Fig. 25, together, duplicate the solid cross section of Fig. 22 and yet a longitudinal vertical section of Fig. 23, at the same point, shows a sled-like planing section similar to that shown in Fig. 15.

As hereinbefore stated, Figs. 26 and 28 illustrate the flow of water and bow waves to, under and past the conventional displacement or hydroplane hull as compared to similar flow of water and bow waves to, under and past this new type of twin-hulls as shown in Figs. 27 and 29. Although my invention functions both as a displacement hull and as a hydroplane hull, we can consider Fig. 26 as a displacement hull operating in rough water and Fig. 28 as a hydroplane hull operating in smooth water, while my duo-purpose twin-hulls are shown in Fig. 27 operating in rough water and in Fig. 29 planing at high speed. For purposes of comparison it is assumed that the hulls represented by Figs. 26 and 28 both have the same displacement, the same horsepower and the same general dimensions, also that the twin-hulls shown in Figs. 27 and 29 together have the same displacement, the same horsepower and the same general dimensions as those of Figs. 26 and 28.

In Fig. 26 the ordinary hull traveling at moderate speed allows some of the water to flow back along its keel or center line to a point where skin friction, or drag, parts it as indicated. The water which is split by the bow shoots off at an angle to form a bow wave. This bow wave represented wasted power and also tends to pull the surface water away from the sides of the boat and out from under the bottom, causing the stern to squat and the bow to pitch and yaw.

In Fig. 27 the two half-hulls, having the characteristics previously described, not only split rough water at the bow to ease shock and pounding, but the bow wave thus formed is made to sustain the hull and leave solid water beneath the hulls. By riding the bow wave greater speed on rough water is possible.

In Fig. 28 the ordinary hull planing at top speed usually rides on its stern with the bow out of water. The lines with arrows indicate the flow of water to and from the concentrated wetted area which is indicated by double cross-hatching. In Figs. 26 and 27 it may be assumed that all of the bottom surfaces are wetted surfaces at slow speed. Besides the lack of stability and safety, the weaving, yawing, pitching and jumping caused by the concentrated water contact indicated in Fig. 28 actually results in a loss of possible top speed.

In Fig. 29 the twin-hull craft planes at high speed on a relatively even keel, with a slicing water-planing contact as indicated by the double cross-hatching. The dihedral angle of attack makes the narrow strip of wetted area more effective than the concentrated area of Fig. 28. It also provides a more continuous fore and aft water contact without increased skin friction and drag. As stated in connection with Fig. 27, at slower speed the bow wave and flow of water follows the angle setting of each half hull, but as speed is increased the flow of water straightens out to parallel the direction of travel. It will be noted that with the exception of the outboard racer (Figs. 10 and 11) the forward half hulls of the other designs are kept apart and not joined at a common bow. The bows are kept apart to permit a flow of undisturbed water to the propeller of Fig. 1 and in all cases to avoid a suction or back pressure between the half hulls. Air is also drawn in between the half hulls and as speed increases the free flow of both water and air helps to pull the water back from under the half hulls parallel to the direction of travel.

The twin-hulls, or half hulls, besides functioning both as a displacement hull and a hydroplane hull, also automatically bank the craft and prevent skidding or capsizing on sharp turns at high speed. This feature is apparent when examining the cross sections shown in Figs. 13 and 14. It will be noted that in a side slip or skid one side will climb and the other will dig in. When deliberately steering such craft the half hull on the inside of the turning radius, by straightening out its angle, will lose some of its lift, while the half hull on the outside turning radius will increase its planing angle and lift, thus automatically banking on turns.

Although other and additional features are shown, the main feature of this invention is the form and arrangement of the buoyant-hydroplane hulls. The dihedral wedge-like planing surfaces may also be used as non-buoyant submerged hydrofoils. It is known that an airplane wing is most effective when its span is great in proportion to its chord. The same would be true as regards a simple submerged hydrofoil. However, if applied to a surface water-planing body, rough water would make it useless and unmanageable. Too, a long narrow planing surface operating parallel to the direction of travel is not an efficient planing form although it does have a better stabilizing effect. An effective compromise is the setting of the planing surfaces at a dihedral angle. A hull with a sharp bow and V-bottom is not as efficient for planing as the flat sled-like bottom of the fundamental hydroplane. A compromise between the V-bottom and sled-like hydroplane hulls would be the two halves of a relatively round bottom hull set at a dihedral angle, as shown in the drawings. Means may be provided for varying or adjusting the dihedral angle setting and means may also be provided for varying the lateral and longitudinal planing angles of the buoyant-hydroplane hulls.

There may be varied grouping and arrangements of such twin-hulls or units. Cushioning means may be used to lessen or absorb pounding and structural stress. Means for propulsion and steering may be varied. The twin-hull or dihedral planing floats may also be used for aircraft and flying boats.

What I claim is:

1. In water craft, hull means comprising a pair of similar float members, each constituting substantially a half hull, and each of said float members having a relatively flat bottom providing a planing surface and having its longitudinal axis and therewith its two lateral water-contacting surfaces laterally divergent from the other float member from bow to stern in V formation.

2. In water craft, hull means comprising a pair of separate similar float members, each constituting substantially a half hull, and each of said float members having a relatively flat bottom providing a planing surface and having its longitudinal axis and therewith its two lateral water-contacting surfaces laterally divergent from the other float member from bow to stern in V formation, and a third float member arranged astern of said divergent float members and lying on a axis bisecting the angle of their divergence, said three float members being connected together and providing three substantially symmetrically spaced contact areas of the hull with the water.

3. Water craft as claimed in claim 2, in which the said third float member is pivotally mounted for steering movement with respect to the other float members.

4. In water craft as claimed in claim 1, each float member being provided with screw propeller means the axis of thrust of which is parallel to a line bisecting the angle of divergence between the two floats.

5. Water craft as claimed in claim 1, in which the bow portions of said float members are in spaced arrangement laterally of the median axis of the hull, to provide a free water passage therebetween.

6. Water craft as claimed in claim 1, in which propulsion means are arranged medially of said V formation, said propulsion means having its axis of thrust coincident with the median axis of the hull.

7. In water craft, hull means comprising a pair of similar float members each constituting substantially a half hull, and each of said float members having a relatively flat bottom providing a planing surface and having its longitudinal axis and therewith its two lateral water-contacting surfaces laterally divergent from the other float member from bow to stern in V formation, and a body or fuselage supported by said float members above and out of contact with the surface of the water upon which the float members bear.

8. Water craft as claimed in claim 7, in which there is provided a third float member arranged aft of said other float members and axially aligned with the median axis of the hull and supporting the stern portion of the body or fuselage.

9. Water craft as claimed in claim 7, in which there is provided a third float member arranged aft of said other float members and axially aligned with the median axis of the hull and supporting the stern portion of the body or fuselage, said third float member being pivoted with respect to the body or fuselage upon a vertical axis and serving as a means for steering the craft.

THOMAS A. EDISON LAKE.